United States Patent

Rothschild

[15] 3,637,259
[45] Jan. 25, 1972

[54] AUTOMATIC SAFETY SEAT BELT
[72] Inventor: Barbara G. Rothschild, 2134 Springdale Drive, Columbus, Ga. 31906
[22] Filed: July 29, 1970
[21] Appl. No.: 59,298

[52] U.S. Cl. .................................. 297/385, 297/387
[51] Int. Cl. ............................................. A62b 35/60
[58] Field of Search ................. 297/385, 388, 384, 390; 340/278, 52 E; 200/61.58 SB; 280/150 SB

[56] References Cited

UNITED STATES PATENTS

| | | |
|---|---|---|
| 3,414,326 | 12/1968 | Raffaelli .......................... 297/385 X |
| 3,147,819 | 9/1964 | Keleher ........................... 297/385 X |
| 2,873,122 | 2/1959 | Peras .............................. 297/384 X |
| 3,074,055 | 1/1963 | Rudolph et al. ................. 297/385 X |
| 3,314,719 | 4/1967 | Johnson .......................... 297/385 |

Primary Examiner—James T. McCall
Attorney—Kimmel, Crowell & Weaver

[57] ABSTRACT

An automatic safety seat belt for use in a vehicle and including an arcuate tubular body support member which is biased to an operative position obstructing seat occupancy and thus necessitating its use, and a latch assembly which is selectively operated in response to actuation of the vehicle power switch to positively retain the arcuate support member in such operative position about the body of a vehicle passenger.

16 Claims, 10 Drawing Figures

INVENTOR
BARBARA G. ROTHSCHILD

BY Kimmel, Crowell & Weaver
ATTORNEYS

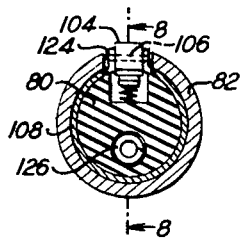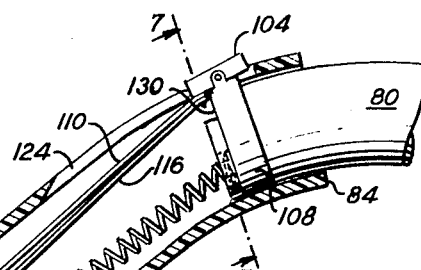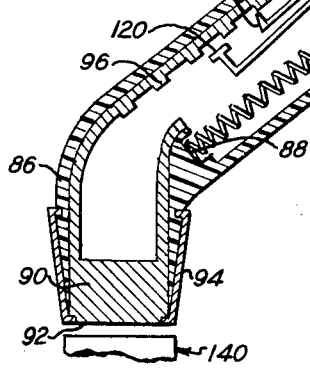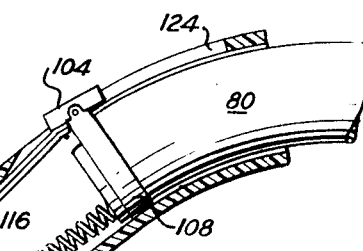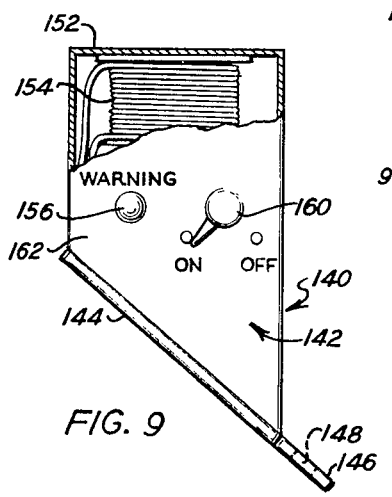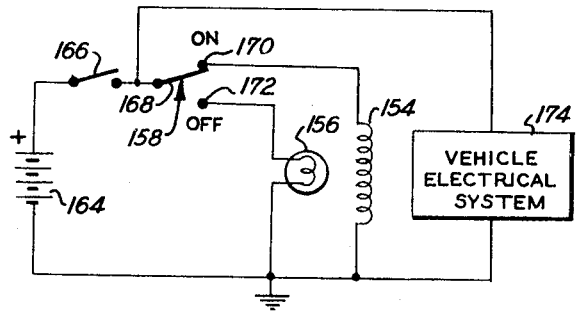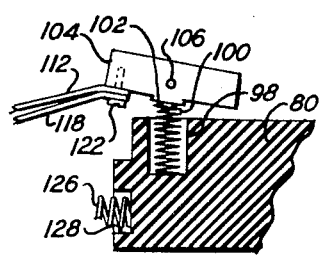

AUTOMATIC SAFETY SEAT BELT

BACKGROUND OF THE INVENTION

1. Field of the Invention

The present invention relates generally to vehicle seat belts and, more particularly, to an automatic safety seat belt having an operatively biased semirigid body support member and an automatically operated latch.

2. Description of the Prior Art

As a result of a number of detailed scientific studies by various safety-oriented transportation groups, it is becoming increasingly evident that the use of passenger restraining safety belts is an important factor in the prevention of serious injury during a collision. Such a conclusion was reached long ago with respect to the use of seat belts on airplanes and has recently been extended to require the installation of seat belts by manufacturers on all new automobiles.

Most seat belts in use today are of the type wherein a pair of flat, flexible belts are firmly anchored to a vehicle and are adapted to be releasably secured together as by a suitable buckle. One of the two belts may be adjustable in length, and a third shoulder harness may also be provided if so desired. While such belts have served the purpose, they have not proven satisfactory under all conditions of operation since they are easily ignored by the vehicle passenger who often considers the nuisance of having to fasten the seat belt more trouble than it is worth, regardless of what the statistics appear to indicate. Thus, no matter what the design, conventional vehicle seat belts which require conscious manipulative action on the part of the passenger are obviously disadvantageous since such belts are frequently not worn causing needless injury in the event of a collision.

The prior art, as exemplified by U.S. Pat. Nos. 2,858,144, 3,198,544 and 3,453,026, is generally cognizant of safety belts which attempt to overcome the problem of passenger nonuse by requiring movement thereof from an obstructing position prior to or during entry into a vehicle such that the passenger is forced to take hold of the seat belt and thus cannot ignore the same while riding in the vehicle. The prior art, however, still exhibits a number of disadvantages in that such conventional seat belts require some definitive latching action by the passenger, are not biased to automatically return to an operative position about the waist of a seated passenger and/or do not automatically open to a fully extended size whenever the vehicle is parked.

SUMMARY OF THE INVENTION

The present invention is generally characterized in that an automatic safety seat belt for a vehicle having a passenger seat and a source of motive power controlled by a power switch includes: an arcuate, semirigid, restraining member adapted to encircle the waist of a passenger and pivotally mounted at one end onto the vehicle for movement, in a plane located within the angle formed by the passenger seat, between an inoperative position and an operative position; a spring biasing the restraining member toward its operative positions; and a latching assembly fixedly mounted onto the vehicle and cooperating with the vehicle power switch and other end of the restraining member to selectively engage the other end of the restraining member in response to actuation of the vehicle power switch for maintaining the restraining member in its operative position.

Accordingly, it is a general object of the present invention to positively assure use of a safety belt without necessitating conscious manipulation thereof by a vehicle passenger.

It is a further object of this invention to construct a safety seat belt which automatically engages the body of a passenger upon entry into the vehicle and which may thereafter be automatically latched in such position in response to actuation of the vehicle ignition switch.

The present invention is advantageous over prior art safety seat belts in that it is simple and economical in construction, requires no conscious manipulation by a passenger in order to be used, may be automatically latched in response to actuation of the vehicle ignition, may be readily released during an emergency, may be automatically released upon deenergization of the vehicle ignition, and resumes its fully open size whenever a passenger leaves the vehicle.

Further objects and advantages of the present invention will become apparent from the following description of a preferred embodiment when taken in conjunction with the accompanying drawings.

BRIEF DESCRIPTION OF THE DRAWINGS

FIG. 5 is a partial cross-sectional view of a detail of the adjusting assembly of FIG. 1 shown in a released fully open position;

FIG. 6 is a partial cross-sectional view of the adjusting assembly of FIG. 5 shown in an engaged, retracted position;

FIG. 7 is a cross-sectional view taken along line 7—7 of FIG. 6 and looking in the direction of the arrows;

FIG. 8 is a partial cross-sectional view taken along line 8—8 of FIG. 7 and looking in the direction of the arrows;

FIG. 9 is a side elevation view, partly broken away, of a detail of the latching assembly of FIG. 1; and FIG. 10 is a schematic diagram of the control circuit of the latching assembly of FIG. 9.

DESCRIPTION OF THE PREFERRED EMBODIMENT

Figure 1:
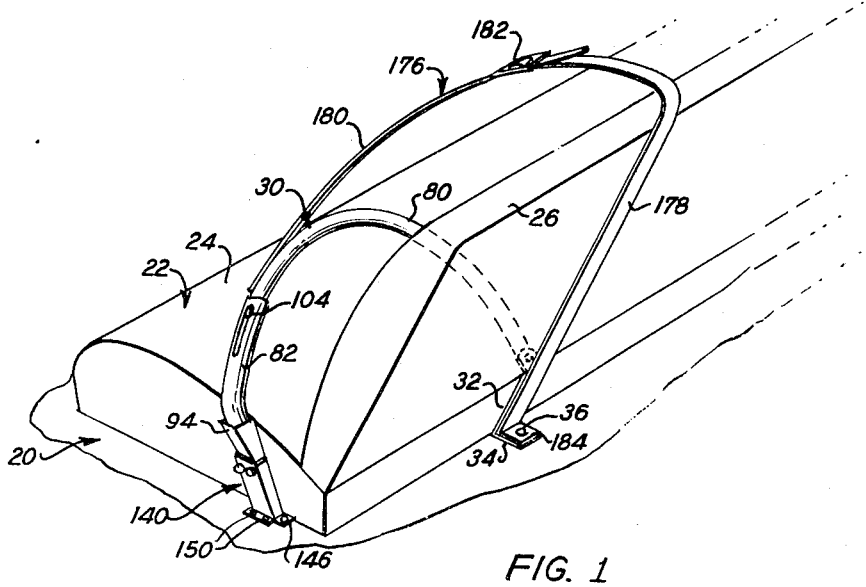
FIG. 1 is a rear perspective view of an automatic safety seat belt according to the present invention shown in an operative position with respect to a vehicle seat.

Referring to the drawings, the present invention is embodied in a vehicle (not shown) having a floor 20 upon which is mounted a conventional seat, indicated generally at 22, having a bottom seat member 24 and an upright seat back 26. As illustrated in FIG. 1, bottom seat member 24 and upright seat back 26 are angularly joined at their lower rear edges so as to comfortably support a passenger in an upright seated position. It should be understood, of course, that the vehicle seat 22 may be mounted to the floor 20 by any suitable technique well known in the art and may be fixed in position or may be adjustable to accommodate various passengers; the angle of seat back 26 may also be adjustable, if desired, to permit the passenger to assume a reclined position.

Figure 4:
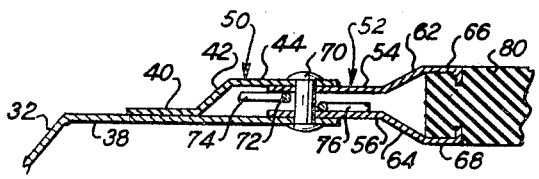
FIG. 4 is a partial cross-sectional view taken along line 4—4 of FIG. 3 and looking in the direction of the arrows.

An automatic safety seat belt according to the present invention is indicated generally at 30 in FIG. 1 and is mounted onto the vehicle floor 20 by a generally Z-shaped bracket 32 having a lower flange 34 which is mounted to floor 20 by any suitable means such as a bolt 36. Bracket 32 has an upper flange 38 which extends in a direction opposite from that of lower flange 34 and is disposed between the lower edge of upright seat back 26 and the rear, top surface of bottom seat 24. It is important to note that flange 38 is bent as illustrated in FIG. 4 to such an angle that the plane of the flange is located within the angle defined by seat 22. Bracket 32 is positioned adjacent the right side of the left passenger seating area, as illustrated, it being understood that the seat belt arrangement shown would be visualized as a mirror image for the right passenger seating area and thus will not be described for the sake of brevity. A plate 40 is rigidly secured to the distal end of upper flange 38 by any suitable means, such as spot welding, and is offset at 42 to provide a parallel top wall 44 which cooperates with a pair of depending sidewalls 46 and 48 to form a generally rectangular housing 50.

Figure 3:
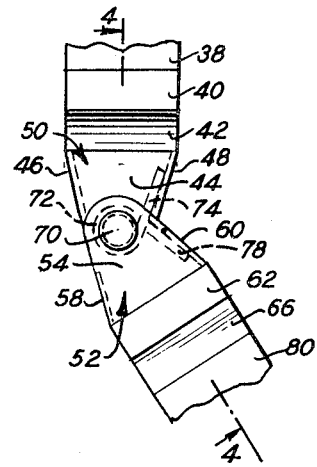
FIG. 3 is a top plan view of a detail of the hinge assembly of FIG. 2.

A second generally rectangular housing 52 includes spaced parallel top and bottom walls 54 and 56, respectively, which are joined by a pair of sidewalls 58 and 60 and are offset at 62 and 64 to form a pair of generally L-shaped parallel walls 66 and 68, respectively. As seen in FIG. 4, housing 52 is slidably disposed within the open end of housing 50 and is joined thereto by an upright pivot pin 70 for pivotal movement about the pin axis. A coil spring 72 is mounted about pin 70 and has a pair of oppositely directed arms 74 and 76 which bear respectively against sidewalls 48 and 60 so as to bias the second housing 52 such that it tends to rotate about pivot pin 70 in a counterclockwise direction as visualized in FIG. 3.

The automatic safety seat belt 30 further includes an arcuate, semirigid tubular body restraining member 80 which is curved to conform to the waist of a seated passenger and is preferably constructed of a suitable plastic or rubber material. Restraining member 80 is firmly attached to the housing 52 by crimping L-shaped walls 66 and 68 into the end of the restraining member as can be seen in FIG. 4 whereupon the restraining member 80 is pivotally mounted to the vehicle for movement in a plane which is located within the angle of the vehicle seat 22 as shown in FIG. 1. Of course, suitable reinforcing for the junction of restraining member 80 and housing 52 may be added, if desired, as by utilizing adhesives, support straps, bolts, or the like. The opposite or free end of restraining member 80 is slidably disposed within a hollow, cylindrical straight sleeve 82 which has a slightly curved open upper end 84 and a somewhat greater curved lower end 86. An interior spring-receiving abutment 88 is formed upon the lower, inner straight wall of sleeve 82, and the lower end 86 of the sleeve is closed by a generally cylindrical plug 90 which is preferably constructed of a magnetically soft or nonretentive material having a smooth, flat bottom face 92. A suitable cap 94 may be provided to assure retention of plug 90 in the lower end 86 of sleeve 82, if desired. Formed upon the upper peripheral surface of cylindrical plug 90 is an elongated notched rod or plate 96 which is suitably supported against the inner surface of the sleeve 82.

The free end of arcuate restraining member 80 defines a radial bore 98 which extends partially through the end of the restraining member, as illustrated in FIG. 8. A biasing spring 100 is freely disposed within radial bore 98 and is maintained in compression between the floor of bore 98 and a protruding spring seat 102 formed upon the bottom surface of a finger switch 104. Switch 104 is tiltably mounted upon a pivot pin 106 which is supported between a pair of upright ears extending from a suitable securing strap 108. As can be seen in FIG. 8, the spring seat 102 of switch 104 is axially offset from the direction of force of vertical compression spring 100 such that switch 104 has two stable positions; i.e., a clockwise rotated position, as shown in FIGS. 6 and 8 and a counterclockwise rotated position, as shown in FIG. 5. In this manner, switch 104 snaps between each of its two positions in response to the exertion of pressure on the right or the left side of the switch. It should be understood, of course, that the snap-action characteristics of switch 104 may be readily altered if desired; for example, by placing spring 100 in an angularly disposed position within member 80, switch 104 would be biased so as to tend to assume its clockwise rotated position, as shown in FIG. 8, whenever the switch is released.

Attached to the left side of finger switch 104 at its bottom surface is a first flexible, resilient elongated rod 110 having a slight bend 112 (FIG. 8) adjacent its proximal end and an angularly disposed catch 114 formed upon its distal end for cooperation with notched plate 96. A second flexible, resilient elongated rod 116 is mounted in superposition with rod 110 and has a slight bend 118 (FIG. 8) adjacent its proximal end and is bent at its free end to form approximately a right angle for supporting a small flat weighted plate 120. Plate 120 is mounted upon the bent lower end of rod 116 so as to lie flat within the grooves of notched plate 96 as can best be seen in FIG. 6 and may be a permanent magnet or may be constructed from a magnetically attractive, nonretentive material depending upon desired operational characteristics of the completed assembly. It is noted that both rods 110 and 116 may be secured to switch 104 by any suitable means such as by a common screw 122.

As can be seen in FIGS. 5 and 6, arcuate restraining member 80 with the finger switch 104 attached thereto is slidably mounted within sleeve 82 with switch 104 protruding through an elongated slot 124 in the upper wall of the sleeve to permit free operation thereof by a vehicle passenger. In addition, a spring 126 is mounted in compression between abutment 88 of sleeve 82 and an axial bore 128 within the end of restraining member 80 so as to bias the restraining member 80 such that it tends to return to a fully extended position relative to the sleeve 82 whenever catch 114 is released from notched plate 96 by operation of finger switch 104. A notch 130 may also be provided in the end of restraining member 80, if desired, so as to preclude obstruction of the counterclockwise rotation of finger switch 104 during use of the seat belt.

Figure 2:
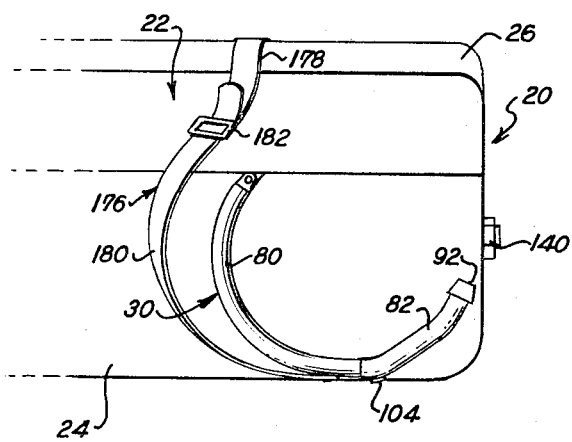
FIG. 2 is a top plan view of the automatic safety belt of FIG. 1 shown in an inoperative position.

The automatic safety belt 30 according to the present invention further includes a latch assembly, indicated generally at 140 in FIGS. 1 and 2, and shown in detail in FIG. 9. Latch assembly 140 includes a generally rectangular housing 142 having a truncated bottom surface terminating in a bottom wall 144 which is disposed at approximately a 45° angle. Bottom wall 144 also has a set of flanges 146 which define a series of holes 148 therethrough such that the entire housing may be rigidly attached to the vehicle floor 20 as by suitable bolts 150 as illustrated in FIG. 1. The housing 142 has a flat upper wall 152 adapted to cooperate with face 92 of plug 90 and which may be integrally or separately formed with respect to the other housing walls and is preferably constructed of a material which is magnetically soft or nonretentive. An electromagnet in the form of a coil, illustrated diagrammatically at 154, is mounted within housing 142 in contact with top wall 152 such that the top wall is selectively magnetized whenever coil 154 receives energizing current, as will be more fully described below. The housing also includes a warning lamp 156 and a two position switch 158 (FIG. 10) having a suitable knob 160, with lamp 156 and switch 158 being mounted upon an outer sidewall 162 of the housing so as to be easily accessible to a vehicle passenger.

Referring to FIG. 10 which is a schematic diagram of the latching assembly of FIG. 9, a source of electrical power such as a vehicle battery 164 has a positive terminal connected to one terminal of a vehicle power or ignition switch 166 which has its other terminal connected to the movable arm 168 of a single-pole, double-throw switch 158. Switch 158 has a pair of fixed contacts 170 and 172 which are connected back to the negative or grounded side of battery 164 through electromagnet coil 154 and warning lamp 156, respectively. The other terminal of ignition switch 166 is also returned to ground through the vehicle electrical system 174. It should be appreciated that the vehicle electrical system 174 may include all or any part of a vehicle's electrical equipment and will not be described in detail for the sake of brevity.

A shoulder harness 176 (FIGS. 1 and 2) preferably includes a pair of flat, flexible belts 178 and 180 joined at one end by a suitable adjusting buckle 182. Belt 178 terminates at its other end in a flange 184 which is firmly secured to the vehicle floor 20 as by common bolt 36, and belt 180 is firmly attached to an intermediate point on the semirigid restraining member 80 by any suitable means such that the shoulder harness 176 passes up, over the seat back 26 and across the passenger seating area where it joins the main restraining harness 30.

Before proceeding with a description of the operation of the automatic safety seat belt according to the present invention, it is important to note that bracket 32, shoulder harness flange 184, and latching assembly 140 need not be secured to the vehicle floor 20, as illustrated, but may be securely attached to the frame (not shown) of seat 22 or may be mounted on tracks on the vehicle floor, with catches that work in unison with the catch that allows the seat to slide forward and back. Such construction may be desired where seat 22 is to be mounted so as to permit adjustment thereof relative to the vehicle floor, for example; of course, such mounting will have to be of sufficient strength to withstand the forces generated during a collision to prevent the seat belt assembly and the seat itself from being broken loose from the vehicle floor 20.

In operation, the automatic safety seat belt 30 is maintained suspended at an angle by the flange 38 of bracket 32 and is biased by coil spring 72 to its operative position shown in FIG. 1. In this position, the seat belt obstructs entry by a passenger who therefore must grasp the belt, either at tubular member 80 or at shoulder harness 176, and pivotally move it up as visualized in FIG. 2. Thereafter, the passenger can easily enter the vehicle whereupon the seat belt is released and automatically reverts to its spring biased operative position about the waist of the passenger. It should be appreciated that up to this point, the only manipulative action required by the passenger is to move the seat belt from its obstructing position so that entry into the vehicle seat is permitted. Such required movement of seat belt 30 must be performed before the passenger can enter and thus soon becomes an unconscious act on the part of the passenger which will always be performed.

After the passenger is seated in the vehicle with the seat belt 30 in its operative position, the belt size may be easily adjusted if necessary by tilting finger switch 104 to the left whereupon catch 114 and weighted plate 120 are disengaged from notched plate 96 as illustrated in FIG. 5. The arcuate, tubular member 80 may thereafter be slidably moved into sleeve 82 until the proper size is reached whereupon the passenger need only rotate finger switch 104 to its clockwise position, shown in FIG. 6, causing catch 114 to engage the shoulder of one of the notches of plate 96 thereby fixing the size of seat belt 30 at its desired position.

The passenger need not mechanically latch the seat belt according to the present invention since the latching assembly 140 is automatically actuated in response to operation of the vehicle ignition switch 166. It should be noted however, that a suitable manual or solenoid-actuated mechanical latch may be provided, if desired. Referring to FIG. 10, and considering the case where knob 160 (FIG. 9) is in its "on" position, electrical power will be fed from the vehicle battery 164 to both the vehicle electrical system 174 and the electromagnet coil 154 upon actuation of the ignition switch 166. Thereafter, top plate 152, which is contacted by the magnetically attractive plug 90 of sleeve 82 under the force of coil spring 72, rapidly becomes magnetized whereupon the plug 90 is firmly held against the latching assembly 140 so as to preclude movement of the seat belt from its operative position. Of course, the attractive force produced by electromagnetic coil 154 will depend upon the number of wire-turns provided thereby and may be preselected to comply with desired safety requirements. The seat belt is thus automatically latched closed so as to safely support the passenger in the event of a subsequent collision.

As the electromagnet coil 154 is energized, the cylindrical plug 90 becomes magnetized. Consequently, the contiguous magnetically attractive notched plate 96 becomes magnetized whereupon the weighted flat plate 120 of resilient rod 116 is attracted thereto, as illustrated in FIG. 6. This provides further support for catch 114 and thus assures positive retention of tubular member 80 within sleeve 82.

Whenever the vehicle is parked and the passenger desires to leave the vehicle, it is only necessary to turn the ignition switch 166 off, as shown in FIG. 10, whereupon electromagnetic coil 154 becomes deenergized and quickly becomes demagnetized. This releases plug 90 from the latching assembly such that the seat belt may be rotated about hinge pin 70 to its inoperative position permitting exit by the passenger. At this same time and due to the magnetically nonretentive property of plug 90 and notched rod or plate 96, the plug 90 and plate 96 rapidly become demagnetized causing the rapid release of weighted plate 120. As a result, plate 120 snaps away from notched plate 96 whereupon the momentum thereof reacts through resilient rod 110 to pull catch 114 away from notched plate 96. When catch 114 is thus released, compression spring 126 acts upon tubular member 80 to cause the seat belt to automatically revert to its fully extended size thereby returning the seat belt to its initial condition.

In the event that it is desired to release the seat belt without actuating the vehicle ignition switch 166, switch 158 may be moved to its "off" position by rotating knob 160 of latching assembly 140 counterclockwise. Referring to FIG. 10, movement of switch 158 disconnects coil 154 from power source 164 while simultaneously placing warning lamp 156 in circuit therewith. This action releases the seat belt while at the same time energizing the warning lamp 156 to notify the passenger that switch 158 is "off" and should be returned to its "on" or normal operating position prior to reentering the vehicle. It is also noted that the circuit of FIG. 10 may be modified whereby the vehicle electrical system 174 is serially connected with switch 158. In that case, movement of switch 158 to its "off" position will deenergize the vehicle electrical system 174 while at the same time releasing the seat belt 30 from latching assembly 140 as described above.

Thus, while the present invention is relatively simple in construction, it is a marked improvement over conventional seat belts in that its use is mandatory, no conscious manipulation is required by a passenger, it is automatically latched in response to actuation of the vehicle power switch, it may be rapidly released in the event of an emergency, and it automatically reverts to its fully open size when released.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a vehicle having a passenger seat and a source of motive power controlled by a power switch movable between an "on" position and an "off" position, an automatic safety seat belt for said vehicle comprising: arcuate, semirigid restraining means adapted to encircle the waist of a passenger and pivotally mounted at one end to the vehicle for movement in a plane located within the angle formed by the passenger seat between an operative position and an inoperative position; means biasing said restraining means towards said operative position; latching means fixedly mounted onto the vehicle so located as to be proximate to the other end of said restraining means when said restraining means is in said operative position; operating means actuable to cause the latching means to constrain said other end of the restraining means against movement; and actuating means responsive to the placement of said switch in said "on" position to actuate said operating means and responsive to the placement of said switch in said "off" position to deactuate said operating means.

2. The invention as recited in claim 1 wherein said latching means, operating means and actuating means comprises: an energizable electric latch connected with said switch; and means for energizing said latch in response to the placement of said switch in said "on" position.

3. The invention as recited in claim 2 wherein said electric latch comprises an electromagnet.

4. The invention as recited in claim 3 wherein said latching means includes safety switch means connected with said electromagnet to selectively disconnect the same from the vehicle power switch.

5. The invention as recited in claim 4 wherein said latching means includes a warning light connected with said safety switch means and energized from said source of power whenever said electromagnet is disconnected from the vehicle power switch by said safety switch means.

6. The invention as recited in claim 1 wherein said biasing means comprises a coil spring mounted upon said restraining means adjacent said one end thereof.

7. The invention as recited in claim 1 wherein said restraining means includes an arcuate, tubular member pivotally mounted at one end to the vehicle and a sleeve member slidably disposed upon the other end of said tubular member.

8. The invention as recited in claim 7 wherein said tubular member comprises a plastic material.

9. The invention as recited in claim 7 wherein said tubular member comprises a rubber material.

10. The invention as recited in claim 7 wherein said restraining means includes catch means affixed to said other end of said tubular member and cooperating with said sleeve member to adjustably secure the same with said tubular member.

11. The invention as recited in claim 10 wherein said sleeve member includes a longitudinally disposed elongated notched plate, and wherein said catch means includes a tiltable switch and a resilient rod attached at one end to said tiltable switch and having an angularly disposed catch at its other end for cooperation with said notched plate.

12. The invention as recited in claim 11 wherein said catch means further includes an additional resilient rod proximally attached to said tiltable switch and having a weighted member at its distal end adapted to be selectively disposed within a notch of said notched plate.

13. The invention as recited in claim 123 wherein said latching means includes an electromagnet, and wherein the distal end of said sleeve member comprises a magnetically attractive material.

14. The invention as recited in claim 13 wherein said notched plate of said sleeve member comprises a magnetically attractive material and is contiguous with said distal end of said sleeve member.

15. The invention as recited in claim 14 wherein said weighted member of said additional resilient rod comprises a magnetically attractive material whereby said weighted member is rapidly released from said notched plate upon deenergization of said electromagnet so as to pull said angularly disposed catch therefrom to automatically release said tubular member from said sleeve member.

16. The invention as recited in claim 15 wherein said restraining means further includes spring means mounted in compression between said tubular member and said sleeve member whereby said restraining means reverts to a fully extended size upon release of said catch means.

* * * * *